(12) United States Patent
Otsuka et al.

(10) Patent No.: US 10,141,812 B2
(45) Date of Patent: Nov. 27, 2018

(54) MOTOR SHAFT, MOTOR AND MOTOR ASSEMBLY

(71) Applicant: MINEBEA CO., LTD., Kitasaku-Gun, Nagano (JP)

(72) Inventors: Makoto Otsuka, Kakegawa (JP); Yutaka Kamogi, Fukuroi (JP); Jun Ohmura, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 209 days.

(21) Appl. No.: 14/993,276

(22) Filed: Jan. 12, 2016

(65) Prior Publication Data

US 2016/0204671 A1 Jul. 14, 2016

(30) Foreign Application Priority Data

Jan. 13, 2015 (JP) .................................. 2015-004452

(51) Int. Cl.
| | | |
|---|---|---|
| *H02K 7/00* | (2006.01) | |
| *F16C 3/02* | (2006.01) | |
| *F16D 1/072* | (2006.01) | |
| *F16C 19/54* | (2006.01) | |

(52) U.S. Cl.
CPC ............. *H02K 7/003* (2013.01); *F16C 3/02* (2013.01); *F16C 19/546* (2013.01); *F16D 1/072* (2013.01)

(58) Field of Classification Search
CPC .. H02K 7/00; H02K 7/003; F16C 3/02; F16C 19/546; F16D 1/072
USPC .................................................. 310/60 A, 61
See application file for complete search history.

(56) References Cited

U.S. PATENT DOCUMENTS

| 7,495,360 B2* | 2/2009 | Imai ...................... H02K 5/225 310/71 |
| 8,415,857 B2* | 4/2013 | Okamoto ................. H02K 1/22 310/264 |
| 8,587,176 B2* | 11/2013 | Kitaori ............... H02K 15/0075 310/194 |

(Continued)

FOREIGN PATENT DOCUMENTS

| JP | S56-115013 U | 9/1981 |
| JP | H02-150541 A | 6/1990 |

(Continued)

OTHER PUBLICATIONS

Office Action dated Sep. 5, 2017 in the corresponding Japanese application No. 2015-004452 and English translation thereof.

*Primary Examiner* — Naishadh Desai
(74) *Attorney, Agent, or Firm* — Carrier Blackman & Associates, P.C.; Joseph P. Carrier; Jeffrey T. Gedeon

(57) ABSTRACT

A motor shaft is configured to be press-fitted into a hole formed in a press-fitted component from a front end side in an axial direction. The motor shaft includes: a shaft body; a first annular projection portion that protrudes outwardly in a radial direction of the shaft body and is brought into contact with an inner circumferential surface of the hole, the first annular projection portion being positioned at a first position; and a second annular projection portion that protrudes outwardly in the radial direction of the shaft body and is brought into contact with the inner circumferential surface of the hole, the second annular projection portion being positioned at a second position that is shifted from the first position toward a rear end side in the axial direction of the shaft body.

15 Claims, 8 Drawing Sheets

(56) References Cited

U.S. PATENT DOCUMENTS

| | | | | |
|---|---|---|---|---|
| 2004/0051419 A1* | 3/2004 | Frank | ...................... | H02K 5/04 |
| | | | | 310/270 |
| 2005/0172755 A1* | 8/2005 | Burgler | .................. | B23P 11/00 |
| | | | | 74/567 |
| 2006/0056750 A1* | 3/2006 | Yamamoto | .............. | C22C 38/02 |
| | | | | 384/100 |
| 2007/0170803 A1* | 7/2007 | Yabe | ........................ | H02K 1/20 |
| | | | | 310/162 |
| 2011/0009199 A1* | 1/2011 | Yamauchi | ........... | B60B 27/0005 |
| | | | | 464/106 |

FOREIGN PATENT DOCUMENTS

| | | |
|---|---|---|
| JP | 2005-534876 A | 11/2005 |
| JP | 2007-010117 A | 1/2007 |
| JP | 2012-257389 A | 12/2012 |
| JP | 2014-126048 A | 7/2014 |

\* cited by examiner

MOTOR SHAFT, MOTOR AND MOTOR ASSEMBLY

BACKGROUND OF THE INVENTION

1. Field of the Invention

The present invention relates to a motor shaft, a motor and a motor assembly.

2. Description of the Related Art

A method of fixing a press-fitted component such as a gear to a motor shaft includes a method of forming a hole for inserting a motor shaft into a press-fitted component, processing the hole such that the inner diameter of the hole of the press-fitted component is slightly less than the outer diameter of the motor shaft and press-fitting and fixing the motor shaft into the hole of the press-fitted component.

Power required to press-fit the motor shaft in the press-fitted component is approximately proportional to a value obtained by multiplying a press-fitting interference ((the outer diameter of the motor shaft)−(the inner diameter of the press-fitted component), by a press-fitting length. If power required for press-fitting is greater than the allowable compression stress of the motor shaft, when the motor shaft is press-fitted into the press-fitted component, the motor shaft may buckle. By decreasing the press-fitting length, power required for press-fitting may decrease such that the motor shaft does not buckle. However, when the press-fitting length decreases, when the motor shaft is press-fitted into the press-fitted component, an inclination easily occurs in the axis of the motor shaft and the axis of the press-fitted component. Therefore, it is not easy to fix the press-fitted component to the motor shaft with high precision.

When the press-fitting length is large, it is possible to fix the press-fitted component to the motor shaft with high precision. When the press-fitting length is high, it is necessary to decrease the upper limit of the press-fitting interference such that power required for press-fitting is less than the allowable compression stress of the motor shaft. The tolerance of the outer diameter of the motor shaft and the inner diameter of the hole of the press-fitted component may be decided according to design so as to decrease the upper limit of the press-fitting interference. However, in an actual manufacturing process, it may be difficult to control the outer diameter of the motor shaft and the inner diameter of the press-fitted component according to design. Therefore, adjustment in a manufacturing process such as stratifying of the processed motor shaft and press-fitted component is required such that power required for press-fitting becomes less than the allowable compression stress of the motor shaft. Accordingly, there is a need for a motor shaft which may be press-fitted into a press-fitted component with small power such that the motor shaft does not buckle.

A serration-processed motor shaft capable of being press-fitted into a female part with small power is suggested in JP-A-2012-257389.

However, even in the motor shaft suggested in JP-A-2012-257389, power required for press-fitting increases in proportion to the press-fitting length. When the press-fitting length increases, adjustment in a manufacturing process such as stratifying of the processed motor shaft and press-fitted component is required such that power required for press-fitting becomes less than the allowable compression stress of the motor shaft.

SUMMARY OF THE INVENTION

One of objects of the present invention is to provide a motor shaft capable of being press-fitted into a press-fitted component with small power to fix the press-fitted component with high precision, and a motor and motor assembly including the motor shaft.

According to an illustrative embodiment of the present invention, there is provided a motor shaft that is to be press-fitted into a hole formed in a press-fitted component from a front end side in an axial direction. The motor shaft includes: a shaft body; a first annular projection portion that protrudes outwardly in a radial direction of the shaft body and is brought into contact with an inner circumferential surface of the hole the first annular projection portion being positioned at a first position; and a second annular projection portion that protrudes outwardly in the radial direction of the shaft body and is brought into contact with the inner circumferential surface of the hole, the second annular projection portion being positioned at a second position that is shifted from the first position toward a rear end side in the axial direction of the shaft body.

DETAILED DESCRIPTION

Figure 1:
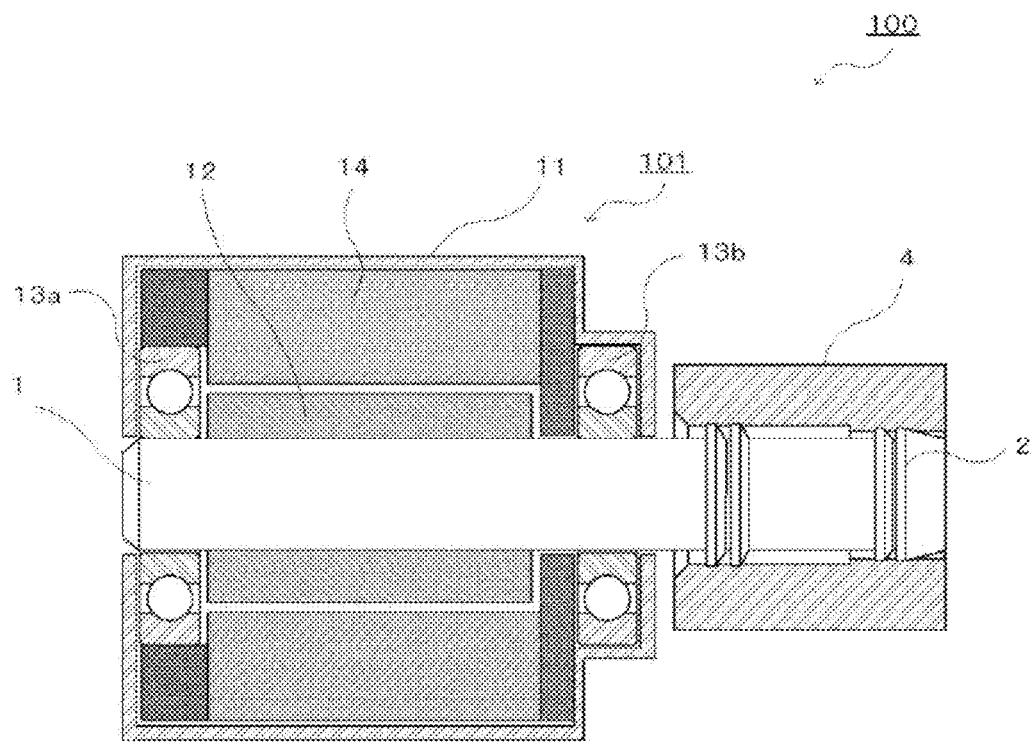
FIG. 1 is a cross-sectional view showing a motor assembly according to a first embodiment of the present invention.

Hereinafter, the motor shaft, the motor and the motor assembly according to the embodiments of the present invention will be described with reference to the drawings. The same or similar portions of the drawings are denoted by the same reference numerals.

FIG. 1 is a cross-sectional view of a motor assembly according to a first embodiment of the present invention. As shown in FIG. 1, the motor assembly 100 includes a motor 101 including a motor shaft 1 and a press-fitted component 4. The motor 101 includes a magnet 12 mounted in the motor shaft 1, a set of bearings 13a and 13b rotatably supporting the motor shaft 1, a coil 14 and a case 11 for receiving the portions, in addition to the motor shaft 1.

The case 11 is a rectangular parallelepiped hollow member. Circular openings are formed in the case 11 in an axial direction at the left and right sides of FIG. 1. The motor shaft 1 is rotatably supported by the set of bearings 13a and 13b in a state in which a front end thereof protrudes outwardly from the right opening.

The magnet 12 is a cylindrical member having a through-hole through which the motor shaft 1 penetrates. The magnet 12 is fixed to the motor shaft 1 inserted into the through-hole.

The coil 14 is arranged to surround the magnet 12. The coil 14 rotates the motor shaft 1 along with the magnet 12 by electromagnetic interaction with the magnet 12.

The press-fitted component 4 is fixed to the front end of the motor shaft 1. The motor shaft 1 has an annular projection 2 in a portion for fixing the press-fitted component 4 and is rotatably shaft-supported by the bearings 13a and 13b and is provided in the case 11. The coil 14 for generating a magnetic field is fixed to the case 11.

When current is supplied to the motor 101, the coil 14 generates a rotation magnetic field. By this rotation magnetic field, the magnet 12 receives power to rotate the motor shaft 1. Next, the motor shaft 1 of the first embodiment will be described.

Figure 2:
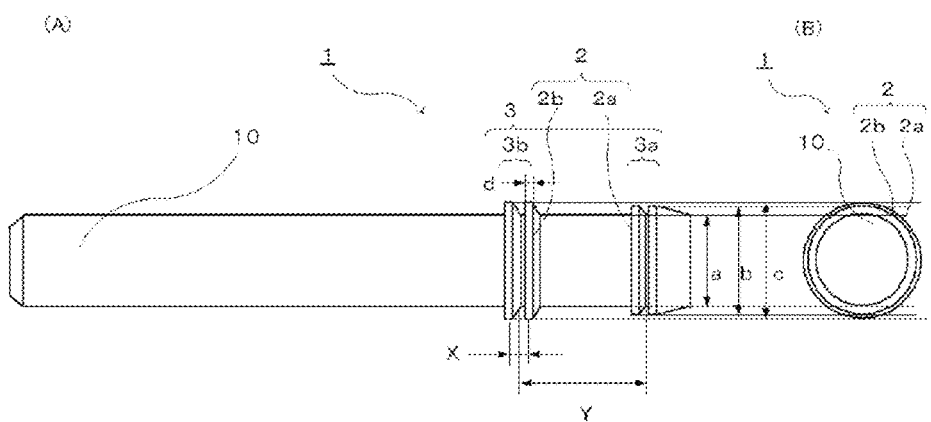
FIG. 2 is a schematic view showing a motor shaft according to the first embodiment of the present invention, wherein section (A) in FIG. 2 is a side view of the motor shaft, and section (B) in FIG. 2 is a front view of the motor shaft.
Figure 3:
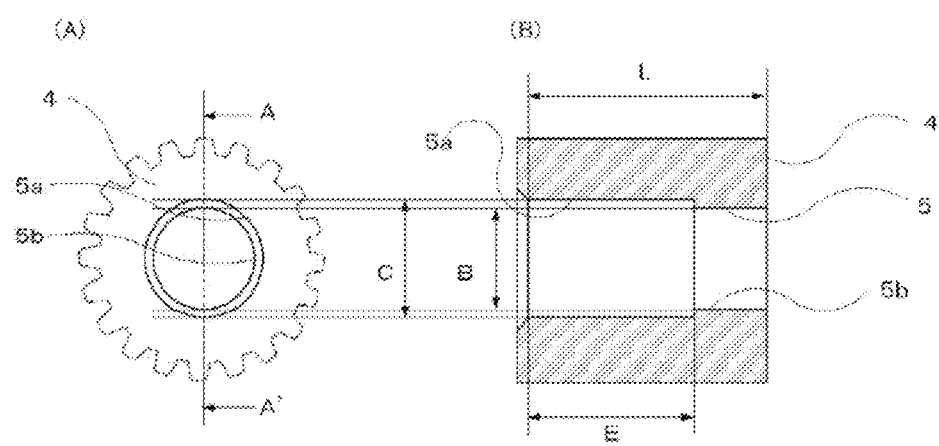
FIG. 3 is a schematic view showing a press-fitted component into which the motor shaft according to the first embodiment of the present invention is press-fitted, wherein section (A) in FIG. 3 is a front view of the press-fitted component, and section (B) in FIG. 3 is a cross-section view of the press-fitted component taken at A-A' line shown in section (A)

As shown in FIG. 2, sections (A) and (B), the motor shaft 1 of the first embodiment includes a cylindrical shaft body 10 having a diameter a and annular projections 2 which are formed at four places in an axial direction and are brought into contact with the inner circumferential surface of a press-fitting hole 5 when the motor shaft 1 is press-fitted into the press-fitted component 4.

The annular projections 2 are projections which protrude outwardly in a radial direction of the shaft body 10 and go around the outer circumferential surface. Two first annular projections 2a are adjacently formed in the vicinity of the axial-direction front end of the press-fitting surface with the press-fitting hole 5 of the pressed-in shaft body 10. The two first annular projections 2a constitute a first annular projection group 3a. The distance between the adjacent first annular projections 2a is X. Two second annular projections 2b are adjacently formed in the vicinity of the axis-direction rear end of the press-fitting surface with the press-fitting hole 5 of the pressed-in shaft body 10. The two second annular projections 2b constitute a second annular projection group 3b. The distance between the adjacent second annular projections 2b is X. The first annular projection group 3a and the second annular projection group 3b are formed to be separated from each other in the axial direction. The distance between the first annular projection group 3a and the second annular projection group 3b is Y which is greater than the distance X. The outer diameter of the first annular projections 2a is b and the outer diameter of the second annular projections 2b is c which is greater than the outer diameter b. The axial-direction length of the first annular projection 2a and the second annular projection 2b is d.

As shown in FIG. 2, sections (A) and (B), the press-fitted component 4 includes a press-fitting hole 5 including a first press-fitting hole 5a which has a press-fitting length L, is formed in the vicinity of an entrance side in which the motor shaft 1 is press-fitted, has an inner circumferential brought into contact with the second annular projections 2b while the second annular projections bites and has a diameter C and a second press-fitting hole 5b which is located at the inner side of the first press-fitting hole 5a, has an inner circumferential surface brought into contact with the first annular projections 2a while the second annular projections bites and has a diameter B less than the diameter C. The press-fitted component 4 is a part which is fixed to the motor shaft 1 and rotates along with the motor shaft 1 and is particularly a gear or the like. The axial-direction length of the first press-fitting hole 5a is E. The length L is greater than the distance Y. The diameter B is slightly less than the outer diameter b of the annular projections 2. The press-fitting interference is expressed by (the outer diameter b−the diameter B). When the diameter B is set to 1 such that the press-fitting interference becomes an appropriate value, the outer diameter b is preferably 1.001 to 1.020. The diameter C is slightly less than the outer diameter c of the annular projections 2. The press-fitting interference is expressed by (the outer diameter c−the diameter C). When the diameter C is set to 1 such that the press-fitting interference becomes an appropriate value, the outer diameter c is preferably 1.001 to 1.020. The diameter B is greater than or substantially equal to the diameter a. The diameter B is preferably substantially equal to the diameter a so as to prevent idle rotation of the motor shaft 1 and the press-fitted component 4 due to contact between the portion other than the annular projections 2 of the motor shaft 1 and the inner circumferential surface of the press-fitting hole 5. In order to reduce power required for press-fitting, the diameter C is preferably greater than the outer diameter b.

Next, a method of press-fitting the motor shaft 1 into the press-fitted component 4 will be described.

The press-fitted component 4 is fixed using a jig or the like. Alignment is performed such that the axis of the press-fitting hole 5 of the fixed press-fitted component 4 and the axis of the motor shaft 1 become equal. The motor shaft 1 is moved in the axial direction and the motor shaft 1 is press-fitted into the press-fitting hole 5 from the side of the first press-fitting hole 5a. When the motor shaft 1 is press-fitted up to a predetermined position, fixing of the motor shaft 1 and the press-fitted component 4 is finished.

Figure 4:
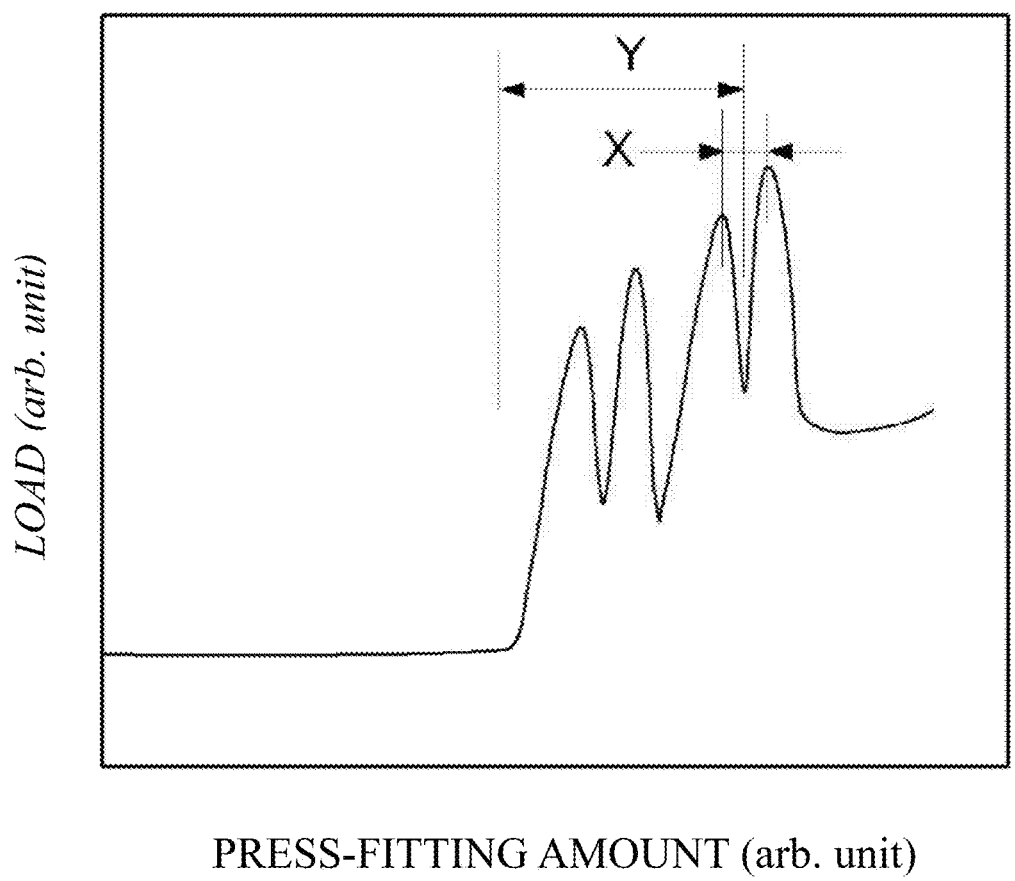
FIG. 4 is a diagram showing a relation between a load and a press-fitting amount when the motor shaft according to the first embodiment of the present invention is press-fitted into the press-fitted component.

Next, a relation between a press-fitting amount and power required for press-fitting (load for press-fitting) when the motor shaft 1 is press-fitted into the press-fitted component 4 will be described. The distance Y is less than the axial-direction length E of the first press-fitting hole 5a. A graph indicating the relation between the press-fitting amount and the load when the motor shaft 1 is press-fitted into the press-fitting hole 5 in arbitrary units is shown in FIG. 4. When the motor shaft 1 is press-fitted into the press-fitting hole 5, the second annular projections 2b of the front end side of the second annular projection group 3b and the end of the first press-fitting hole 5a are brought into contact with each other such that the load for press-fitting increases. While the end of the first press-fitting hole 5a passes through the second annular projections 2b, the load becomes a peak. When the motor shaft is further press-fitted, the load decreases, but, when the end of the first press-fitting hole 5a starts to be brought into contact with the second annular projections 2b of the rear end side of the second annular projection group 3b, the load increases again. Therefore, when the end of the first press-fitting hole 5a passes through the second annular projections 2b of the rear end side, the load becomes a peak. Thereafter, the load for press-fitting decreases. Next, when the motor shaft 1 is further press-fitted into the press-fitting hole 5, the first annular projection 2a of the front end side of the first annular projection group 3a and the end of the second press-fitting hole 5b are brought into contact with each other such that the load for press-fitting increases. While the end of the second press-fitting hole 5b passes through the first annular projection 2a of the front end side, the load becomes a peak. When the motor shaft is further press-fitted, the load decreases, but, when the end of the second press-fitting hole 5b starts to be brought into contact with the first annular projections 2a of the rear end side of the first annular projection group 3a, the load increases again. Therefore, when the end of the second press-fitting hole 5b passes through the first annular projections 2a of the rear end side, the load becomes a peak. Thereinafter, when the motor shaft is further press-fitted, the load for press-fitting decreases. The press-fitting width of the previous two peaks and the press-fitting width of the next two peaks are equal to the distance X. The widths of the previous two peaks and the next two peaks are less than the distance Y.

Figure 5:
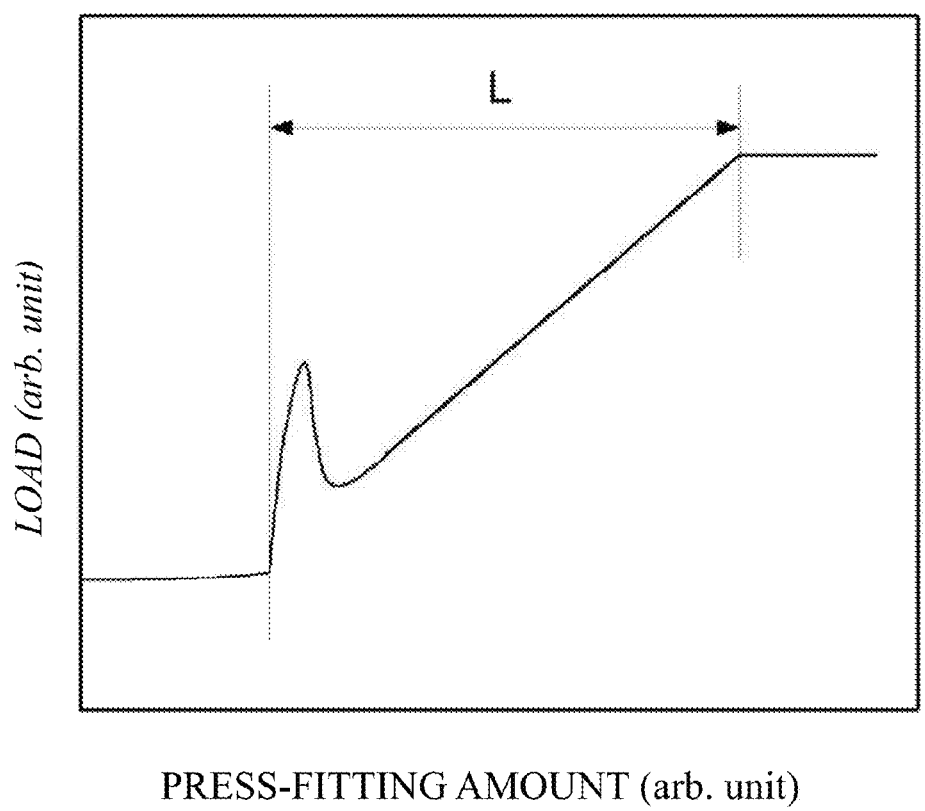
FIG. 5 is a diagram showing a relation between a load and a press-fitting amount when a conventional motor shaft is press-fitted into a press-fitted component.
Figure 11:
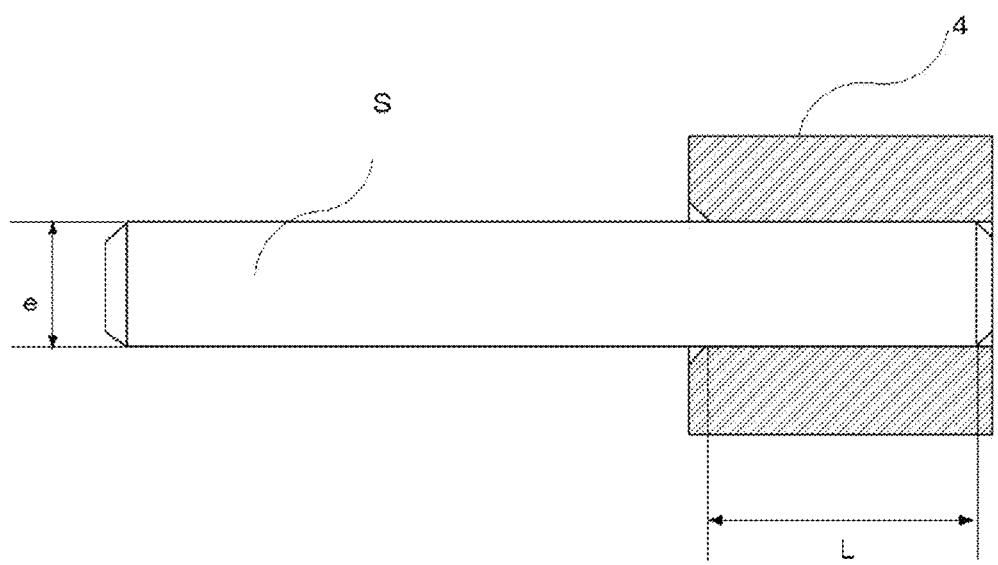
FIG. 11 is a cross-sectional view showing a state in which a conventional motor shaft is press-fitted into a press-fitted component.

A relation between a press-fitting amount and a load when a conventional motor shaft S without the annular projections 2 shown in FIG. 11 is press-fitted into the press-fitted component 4 will now be described. A graph showing the relation between a press-fitting amount and the load when the motor shaft S is press-fitted into the press-fitted component 4 in arbitrary units is shown in FIG. 5. When the front end of the motor shaft S and the end of the press-fitting hole 5 start to be brought into contact with each other, the load increases and becomes a peak. Thereafter, the load decreases and then linearly increases to become a peak when the motor shaft S is completely press-fitted into the press-fitting hole 5. When the motor shaft S is further press-fitted into the press-fitted component 4, the maximum load is required. When the conventional motor shaft S is press-fitted into the press-fitted component 4, the press-fitting distance requiring the load is a length L.

Next, power P required to press-fit the motor shaft 1 in the press-fitted component 4 will be compared with power p required to press-fit the motor shaft S in the press-fitted component 4. Power required for press-fitting is substantially proportional to ((the press-fitting interference)×(the axial-direction length of contact between the motor shaft and the press-fitted component)). Power P necessary to press-fit the motor shaft 1 into the press-fitted component 4 is substantially proportional to ((the press-fitting interference)×((the axial-direction length d of contact between the motor shaft 1 and the press-fitted component 4)×(the number of annular projections 2, which is 4 in this embodiment))). In contrast, power p required to press-fit the motor shaft S in the press-fitted component 4 is substantially proportional to ((the press-fitting interference)×(the axial-direction length L of the press-fitting hole 5 of the press-fitted component 4)). The outer diameter of the motor shaft S is e, the outer diameter e is slightly greater than the diameter B, and the press-fitting interference is expressed by (the outer diameter e−the diameter B).

As described above, according to the first embodiment, by forming, in the shaft body 10, the annular projections 2, which are brought into contact with the inner circumferential surface of the press-fitting hole 5 of the press-fitted component 4, power required for press-fitting increases in every annular projection 2 but decreases in portions excluding the annular projections 2. By setting the dimensions (Y and E) of the motor shaft 1 and the press-fitted component 4 such that load occurrence timings are deviated upon press-fitting, the press-fitting distance necessary for press-fitting may decrease. In addition, when power P required for press-fitting is ((length d×4)/length L) times power p required for press-fitting when (the press-fitting interference outer diameter b−the diameter B), (the outer diameter c−the diameter C) and (the outer diameter e−the diameter B) are the same. More specifically, when the length d=the length L/40, power P required for press-fitting is 1/10 of power p required for press-fitting. Therefore, the motor shaft 1 may be press-fitted into the press-fitted component with a smaller load than that of the motor shaft S. That is, the maximum value of the load for press-fitting the motor shaft 1 shown in FIG. 4 into the press-fitted component 4 is less than the maximum value of the load for press-fitting the motor shaft S shown in FIG. 5 into the press-fitted component 4. Power P necessary for press-fitting may be adjusted by changing the length d even when the press-fitting interference is the same. When the allowable compression stress of the motor shaft 1 and the allowable compression stress of the motor shaft S are the same, the upper limit of the press-fitting interference in which the motor shaft 1 does not buckle is (length L/(length d×4)) times the upper limit of the press-fitting interference in which the motor shaft S does not buckle. More specifically, when the length d=the length L/40, the upper limit of the press-fitting interference in which the motor shaft 1 does not buckle is 10 times the upper limit of the press-fitting tightening margin in which the motor shaft S does not buckle. By forming the annular projections 2 in the motor shaft 1, the upper limit of the press-fitting interference can increase, thereby reducing burdens on adjustment such as stratifying in the manufacturing process.

Since the outer diameter of the first annular projection 2a is b and the outer diameter of the second annular projection 2b is c greater than the outer diameter b, when the motor shaft 1 is press-fitted into the press-fitting hole 5, the motor shaft 1 may be press-fitted into the press-fitted component 4 with low power until the first press-fitting hole 5a and the second annular projection 2b are brought into contact with each other.

By adjacently forming the annular projections 2 and configuring the annular projection group 3, chipping of the front end of the projection is left between the projections to increase biting. Since the number of annular projections 2 may increase, collapse of the projections of the annular projections 2 or biting into the inner circumferential surface of the press-fitting hole 5 of the press-fitted component 4 may increase to increase fastening power. Since a plurality of annular projections 2 is mounted in the axis direction of the shaft body 10, it is possible to prevent the inclination of the axis of the motor shaft 1 and the axis of the press-fitted component 4. When the distance Y is large, it is possible to further prevent the axial-direction inclination of the press-fitted component 4. Therefore, the distance Y is preferably large. When the motor shaft 1 is made of a material having Vickers hardness less than that of the press-fitted component 4, the annular projections 2 collapse and galling with the inner circumferential surface of the press-fitting hole 5 of the press-fitted component 4 is caused, such that the motor shaft is strongly fixed. For example, if the press-fitted component 4 is sintered metal, the suitable material of the shaft is SUS303 of stainless steel.

In contrast, in the motor shaft S without the annular projections 2, power required for press-fitting linearly increases and does not decrease in midstream and the press-fitting distance necessary for press-fitting is the length L and cannot be reduced.

Figure 6:
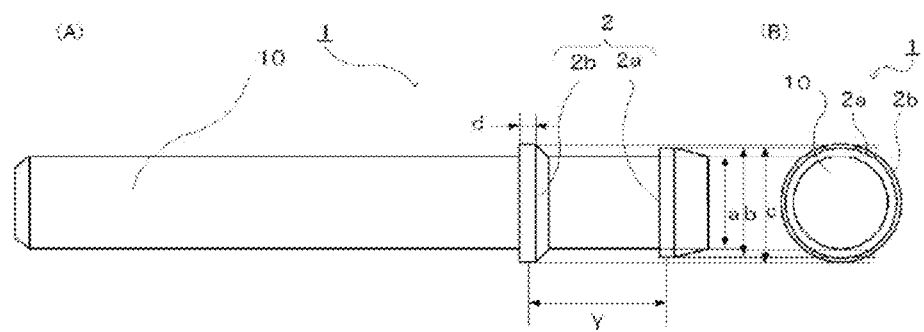
FIG. 6 is a schematic view showing a motor shaft according to a second embodiment of the present invention, wherein section (A) is a side view of the motor shaft, and section (B) is a front view of the motor shaft.

The motor shaft 1 of the second embodiment has a cylindrical shaft body 10 having a diameter a and annular projections 2 which are formed at two places of the axial direction and are brought into contact with the inner circumferential surface of the press-fitting hole 5 when the motor shaft 1 is press-fitted into the press-fitted component 4, as shown in FIG. 6, sections (A) and (B).

The annular projections 2 are projections which protrude outwardly in a radial direction of the shaft body 10 and go around the outer circumferential surface. A first annular projection 2a is formed in the vicinity of the axial-direction front end of the press-fitting surface with the press-fitting hole 5 of the press-fitted shaft body 10. A second annular projection 2b is formed in the vicinity of the axial-direction rear end of the press-fitting surface with the press-fitting hole 5 of the press-fitted shaft body 10. The outer diameter of the first annular projection 2a is b and the axial-direction length thereof is d. The outer diameter of the second annular projection 2b is c and the axial-direction length thereof is d. The axis-direction distance between the first annular projection 2a and the second annular projection 2b is Y.

Figure 7:
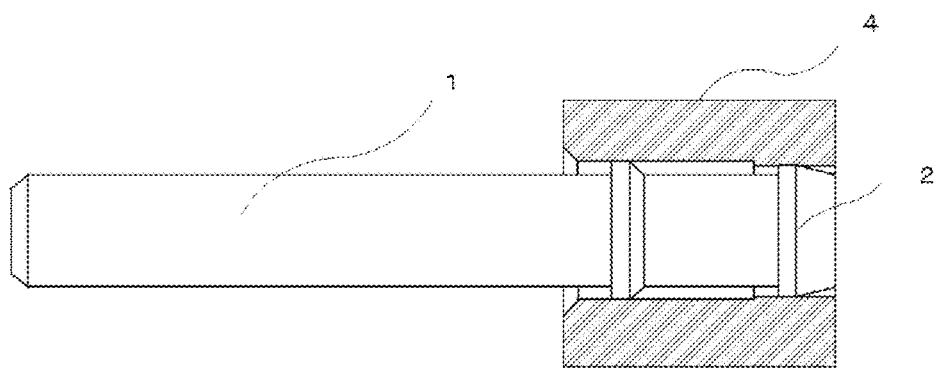
FIG. 7 is a cross-sectional view showing a state in which the motor shaft according to the second embodiment of the present invention is press-fitted into the press-fitted component.

The press-fitted component 4 is equal to that of the first embodiment. The method of press-fitting the motor shaft 1 into the press-fitted component 4 is equal to that of the first embodiment. The motor shaft 1 press-fitted into the press-fitted component 4 is shown in FIG. 7.

Figure 8:
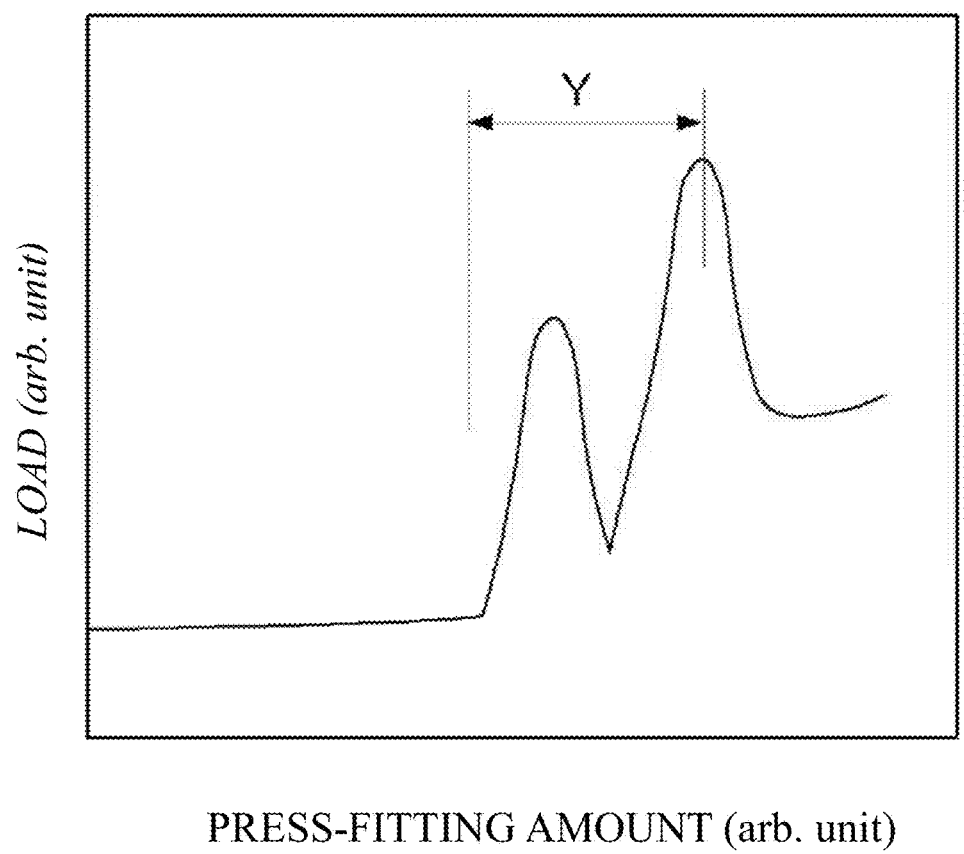
FIG. 8 is a diagram showing a relation between a load and a press-fitting amount when the motor shaft according to the second embodiment of the present invention is press-fitted into the press-fitted component.

Next, a relation between a press-fitting amount and power required for press-fitting (load for press-fitting) when the motor shaft 1 is press-fitted into the press-fitted component 4 will be described. The distance Y is less than the axial-direction length E of the first press-fitting hole 5a. A graph indicating the relation between the press-fitting amount and the load when the motor shaft 1 is press-fitted into the press-fitting hole 5 in arbitrary units is shown in FIG. 8. When the motor shaft 1 is press-fitted into the press-fitting hole 5, the second annular projection 2b and the end of the first press-fitting hole 5a start to be brought into contact with each other such that the load for press-fitting increases. While the end of the first press-fitting hole 5a passes through the second annular projection 2, the load becomes a peak. Thereafter, the load decreases and, when the first annular projection 2a and the end of the second press-fitting hole 5b start to be brought into contact with each other, the load increases. When the end of the second press-fitting hole 5b passes through the first annular projection 2a, the load becomes a peak. Thereafter, the load decreases. The width of the press-fitting amount of the two peaks is less than the distance Y.

As described above, according to the second embodiment, by forming, in the shaft body 10, the annular projection 2 which is brought into contact with the inner circumferential surface of the press-fitting hole 5 of the press-fitted component 4, power required for press-fitting increases in the annular projection 2 but decreases in the portions excluding the annular projection. In contrast, in the motor shaft S without the annular projection 2, power required for press-fitting linearly increases and does not decrease in midstream. When power P required to press-fit the motor shaft 1 into the press-fitted component 4 is less than that of the motor shaft S without the annular projection 2 if the press-fitting interference is the same similarly to the motor shaft 1 of the first embodiment. Therefore, similarly to the motor shaft 1 of the first embodiment, the motor shaft 1 of the second embodiment may be press-fitted into the press-fitted component 4 with a load smaller than that of the motor shaft S without the annular projection 2. The upper limit of the press-fitting interference in which the motor shaft 1 does not buckle may increase by forming the annular projection 2 in the motor shaft 1 similarly to the motor shaft 1 of the first embodiment, thereby reducing burdens on adjustment such as stratifying in the manufacturing process.

Since a plurality of annular projections is formed in the axial direction of the shaft body 10, it is possible to prevent the inclination of the axis of the motor shaft 1 and the axis of the press-fitted component 4. Therefore, it is possible to fix the motor shaft 1 and the press-fitted component 4 with high precision. When the distance Y is large, it is possible to further prevent the axial-direction inclination. Therefore, the distance Y is preferably large. Since the outer diameter of the first annular projection 2a is b and the outer diameter of the second annular projection 2b is c greater than the outer diameter b, when the motor shaft 1 is press-fitted into the press-fitting hole 5, the motor shaft 1 may be pressed-fitted into the press-fitted component 4 with low power until the first press-fitting hole 5a and the second annular projection 2b are brought into contact with each other. The motor shaft 1 of the second embodiment is suitable for cases in which there is a risk of bucking deformation of a thin shaft.

When the motor shaft 1 is made of a material having Vickers hardness less than that of the press-fitted component 4, the annular projection 2 collapses and galling with the inner circumferential surface of the press-fitting hole 5 of the press-fitted component 4 is caused, such that the motor shaft is strongly fixed. For example, if the press-fitted component 4 is sintered metal, the suitable material of the shaft is SUS303 of stainless steel.

Figure 9:
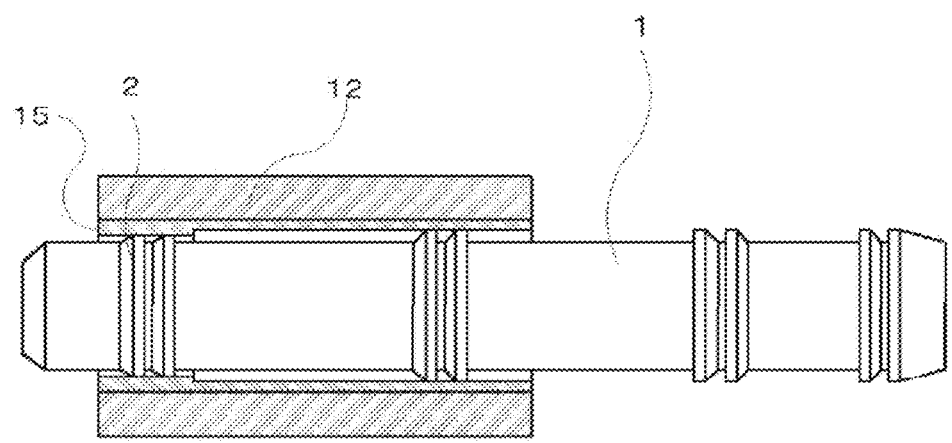
FIG. 9 is a cross-sectional view showing a state in which a motor shaft according to a first modification of the present invention is press-fitted into a magnet.

Although, in the first and second embodiments, the case in which the portion protruding from the case 11 of the motor shaft 1 is press-fitted into the press-fitted component 4 is described, the press-fitted component 4 may be located between two bearings supporting the shaft. As shown in FIG. 9, the annular projection 2 may be formed in the motor shaft 1 of the portion, into which the magnet 12 is inserted. When the motor shaft 1 is press-fitted into the magnet 12, the outer diameter of the annular projection 2 of the front end side of the motor shaft 1 is less than that of the annular projection 2 of the rear end side, a metal sleeve 15 is loosely fitted into the through-hole of the magnet 12 and the inner diameter of the entrance of the metal sleeve 15 is greater than that of the inner side of the metal sleeve. In this case, when the motor shaft 1 is press-fitted into the metal sleeve 15, the same effects as when the motor shaft 1 is press-fitted into the press-fitted component 4 is obtained. Since the plurality of annular projections is formed in the axial direction of the motor shaft 1, it is possible to prevent the inclination of the axes of the motor shaft 1 and the magnet 12. The press-fitted component 4 may be a part having a weight, such as a flywheel made of tungsten and a part such as a metal hub for stopping an impeller for a fan motor.

Although two annular projections 2 constitute the annular projection group 3 in the first embodiment, three or more annular projections may constitute the annular projection group 3. Although two annular projection groups 3 are formed in the motor shaft 1 in the first embodiment, three or more annular projection groups may be formed in the motor shaft 1. Although two annular projections 2 are formed in the motor shaft 1 in the second embodiment, three or more annular projections may be formed in the motor shaft 1.

If the diameter e of the motor shaft S is small (6 mm or less), particularly, if power required for press-fitting is large, the motor shaft S easily buckles. In the motor shaft 1 of the first and second embodiments, since power required for press-fitting can decrease, it is possible to prevent the motor shaft 1 from buckling even when the diameter a of the motor shaft 1 is small (6 mm or less).

Figure 10:
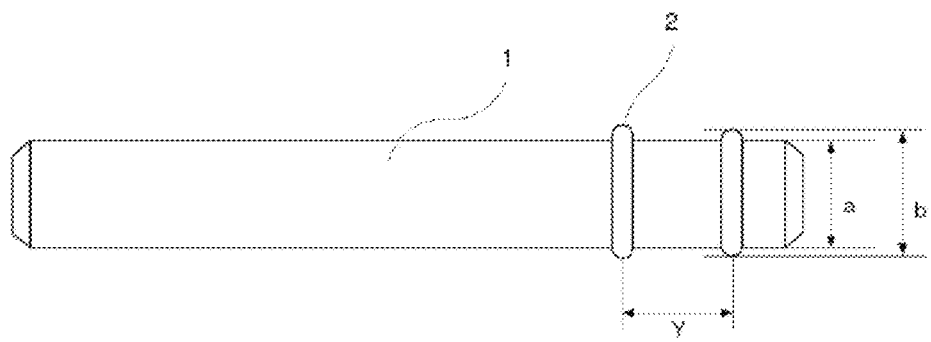
FIG. 10 is a side view of a motor shaft according to a second modification of the present invention.

Although the annular projection 2 has a rectangular cross section in the first and second embodiments, as shown in FIG. 10, the annular projection 2 may have an arch cross section. In this case, the apex of the arch is elastically deformed such that the motor shaft 1 and the press-fitted component 4 are fixed. Although the diameter b of the first annular projection 2a is less than the diameter c of the second annular projection 2b in the first and second embodiments, the diameter b may be equal to the diameter c. In this case, since the press-fitting hole 5 of the press-fitted component 4 may be made straight, it is easy to manufacture the press-fitted component 4.

Various embodiments and modifications of the present invention are possible without departing from the scope and spirit of the invention. The above-described embodiments have been disclosed for illustrative purposes and do not limit the scope of the present invention.

As described with reference to the embodiments and its modifications, according to the present invention, there is provided a motor shaft capable of being press-fitted into a press-fitted component with small power to fix the press-fitted component with high precision, and a motor and motor assembly including the motor shaft.

What is claimed is:

1. A motor shaft that is press-fitted into a hole formed in a press-fitted component from a front end side in an axial direction, the motor shaft comprising:
   a shaft body;
   a first annular projection portion that protrudes outwardly in a radial direction of the shaft body and is brought into contact with an inner circumferential surface of the hole, the first annular projection portion being positioned at a first position; and
   a second annular projection portion that protrudes outwardly in the radial direction of the shaft body and is brought into contact with the inner circumferential surface of the hole, the second annular projection portion being positioned at a second position that is shifted from the first position toward a rear end side in the axial direction of the shaft body,
   wherein the first annular projection portion includes a plurality of first annular projections,
   wherein the second annular projection portion includes a plurality of second annular projections, and
   wherein a distance between the first position and the second position is greater than a distance between an adjacent two of the first annular projections and a distance between an adjacent two of the second annular projections in the axial direction.

2. The motor shaft according to claim 1,
   wherein the first annular projection portion is separated from the second annular projection portion.

3. The motor shaft according to claim 2,
   wherein the first annular projection portion is positioned on a press-fitting surface of the shaft body where the press-fitted component is inserted at the first position near the front end of the shaft body, and
   wherein the second annular projection portion is positioned on the press-fitting surface near the rearmost end of the press-fitting surface.

4. The motor shaft according to claim 1,
   wherein an outer diameter of the first annular projection portion is smaller than that of the second annular projection portion.

5. The motor shaft according to claim 1,
   wherein the motor shaft is made of a material having hardness lower than that of the press-fitted component.

6. The motor shaft according to claim 5,
   wherein the motor shaft is made of SUS303 stainless steel.

7. A motor comprising:
   the motor shaft according to claim 1;
   a magnet attached to the motor shaft; and
   a coil that rotates the motor shaft along with the magnet by electromagnetic interaction with the magnet.

8. A motor assembly comprising:
   the motor according to claim 7; and
   the press-fitted component.

9. The motor assembly according to claim 8,
   wherein the hole of the press-fitted component includes:
   a first press-fitting hole positioned in the vicinity of an entrance into which the motor shaft is press-fitted and having a first inner circumferential surface that is brought into contact with the second annular projection portion in a state where the second annular projection portion bites into the first inner circumferential surface; and
   a second press-fitting hole positioned at deeper side from the entrance with an inner diameter smaller than that of the first press-fitting hole and having a second inner circumferential surface that is brought into contact with the first annular projection portion in a state where the first annular projection portion bites into the second inner circumferential surface.

10. The motor assembly according to claim 9,
    wherein a distance between the first annular projection portion and the second annular projection portion is smaller than a depth of the first press-fitting hole.

11. A motor shaft that is press-fitted into a hole formed in a press-fitted component from a front end side in an axial direction, the motor shaft comprising:
    a shaft body;
    a first annular projection portion that protrudes outwardly in a radial direction of the shaft body; and
    a second annular projection portion that protrudes outwardly in the radial direction of the shaft body,
    wherein the first annular projection portion includes a plurality of first annular projections,
    wherein the second annular projection portion includes a plurality of second annular projections, and
    wherein a distance between the first annular projection portion and the second annular projection portion is greater than a distance between adjacent first annular projections and a distance between adjacent first annular projections in the axis direction.

12. The motor shaft according to claim 11,
    wherein the first annular projection portion is separated from the second annular projection portion in the axial direction.

13. The motor shaft according to claim 11,
    wherein the first annular projection portion is positioned at a first position, and
    wherein the second annular projection portion is positioned at a second position that is shifted from the first position toward a rear end side in the axial direction of the shaft body.

14. A motor comprising:
the motor shaft according to claim 11;
a magnet attached to the motor shaft; and
a coil that rotates the motor shaft along with the magnet by electromagnetic interaction with the magnet.

15. A motor assembly comprising:
the motor according to claim 14; and
the press-fitted component.

\* \* \* \* \*